(12) United States Patent
Cuomo et al.

(10) Patent No.: US 6,460,090 B1
(45) Date of Patent: *Oct. 1, 2002

(54) METHOD AND SYSTEM FOR SELF-TESTING CONTROLS

(75) Inventors: Gennaro A. Cuomo, Apex; Richard J. Redpath, Cary, both of NC (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 874 days.

(21) Appl. No.: 08/696,290

(22) Filed: Aug. 13, 1996

(51) Int. Cl.[7] .................................. G06F 9/40
(52) U.S. Cl. ................... 709/328; 717/125; 345/762
(58) Field of Search .................... 395/680, 682, 395/701–709; 709/328

(56) References Cited

PUBLICATIONS

Hewitt, Neil, "Visual Java?" EXE:The Software Developer's Magazine, pp(6), May 1996.*
Leach, Norvin; Baron, Talila, "Microsoft shows tool upgrades; hones VB's screen configuration, Java's code generator, Web kits" PC Week, v13, n23, p100(1), Jun. 1996.*
Barr, Jeff, "Symantec's Cafe" Software Development, pp(5), May 1996.*
"How to Print a VB Picture Control Using Windows API Functions", Microsoft Corporation, Jun. 21, 1995 p. 1–4.*
Smith, Paul, Controls to extend VB Functionality; Micro-Help Inc for Microsoft's Visual Basic, Jun. 29, 1994 p. 1–2.*

* cited by examiner

Primary Examiner—St. John Courtenay, III
(74) Attorney, Agent, or Firm—A. Bruce Clay; Myers, Bigel, Sibley & Sajovec, P.A.

(57) ABSTRACT

Self-testing controls are packaged together for use by a developer. The controls are enabled without the need for a custom written outside program.

3 Claims, 6 Drawing Sheets

FIG. 4

```
package ibm.swidgets;
import java.awt.*;

public class ScrollPanel extends Panel {
    Panel sp;
    Panel clipper = new Panel( );
    Scrollbar vsb = new Scrollbar(Scrollbar.VERTICAL);
    Scrollbar hsb = new Scrollbar(Scrollbar.HORIZONTAL);
    GridBagLayout gb = new GridBagLayout( );

public ScrollPanel(Panel p) {
        :
        source code
        :
    } public synchronized void reshape(int x, int y, int width, int height) {
        :
        source code
        :
    } public boolean handleEvent(Event evt) {
        :
        source code
        :
    }
}
```

FIG. 5

```
package ibm.swidgets;
import java.awt.*;

public class ScrollPanel extends Panel {
    Panel sp;
    Panel clipper = new Panel( );
    Scrollbar vsb = new Scrollbar(Scrollbar.VERTICAL);
    Scrollbar hsb = new Scrollbar(Scrollbar.HORIZONTAL);
    GridBagLayout gb = new GridBagLayout( );

public ScrollPanel(Panel p) {
        :
        source code
        :
    } public synchronized void reshape(int x, int y, int width, int height) {
        :
        source code
        :
    } public boolean handleEvent(Event evt) {
        :
        source code
        :                          500
    } public static void main(String args[ ]) {
        :
        source code
        :
    }
}
```

METHOD AND SYSTEM FOR SELF-TESTING CONTROLS

FIELD OF THE INVENTION

This invention relates in general to computer software, and in particular to a method and system of packaging to allow self-testing of user interface controls without the programmer being required to ship application code examples to demonstrate use of the control or to know the intrinsic API of the control to write code to review the control.

BACKGROUND OF THE INVENTION

Data processing and data base access systems commonly provide graphical user interface use controls for display and for input of information. Controls enable the user of the data processing system to utilize the system in an appropriate manner. Clearly, data processing systems need controls for universal use of the system by users.

There currently exists a competitive industry for programmers to choose controls for appropriate use. However, these controls require the programmer to write source code to inspect the look and feel of the control to determine the appropriateness. Therefore, a need exists for a method and system of providing a packaging system which can seamlessly deliver the control for programming use and can also allow the programmer to inspect the look and feel of the control.

SUMMARY OF THE INVENTION

An object of the present invention is to provide a method for a packaging system for a control which enables a self-inspection of the control without a custom outside program or knowlege of ist API to write code to review the control. To achieve the foregoing objects and in accordance with the purpose of the invention as broadly described herein, a packaging method for a control is provided which allows self inspection. These and other features, aspects, and advantages of the present invention will become better understood with reference to the following description, appended claims, and accompanying drawings.

BRIEF DESCRIPTION OF THE DRAWINGS

For a more complete understanding of the present invention and for further advantages thereof, reference is now made to the following Detailed Description taken in conjunction with the accompanying drawings, in which:

FIG. 4 is a sample of source code required to produce a control;

FIG. 5 illustrates the source code of FIG. 4 modified in accordance with the present invention.

DETAILED DESCRIPTION OF THE INVENTION

Figure 1:
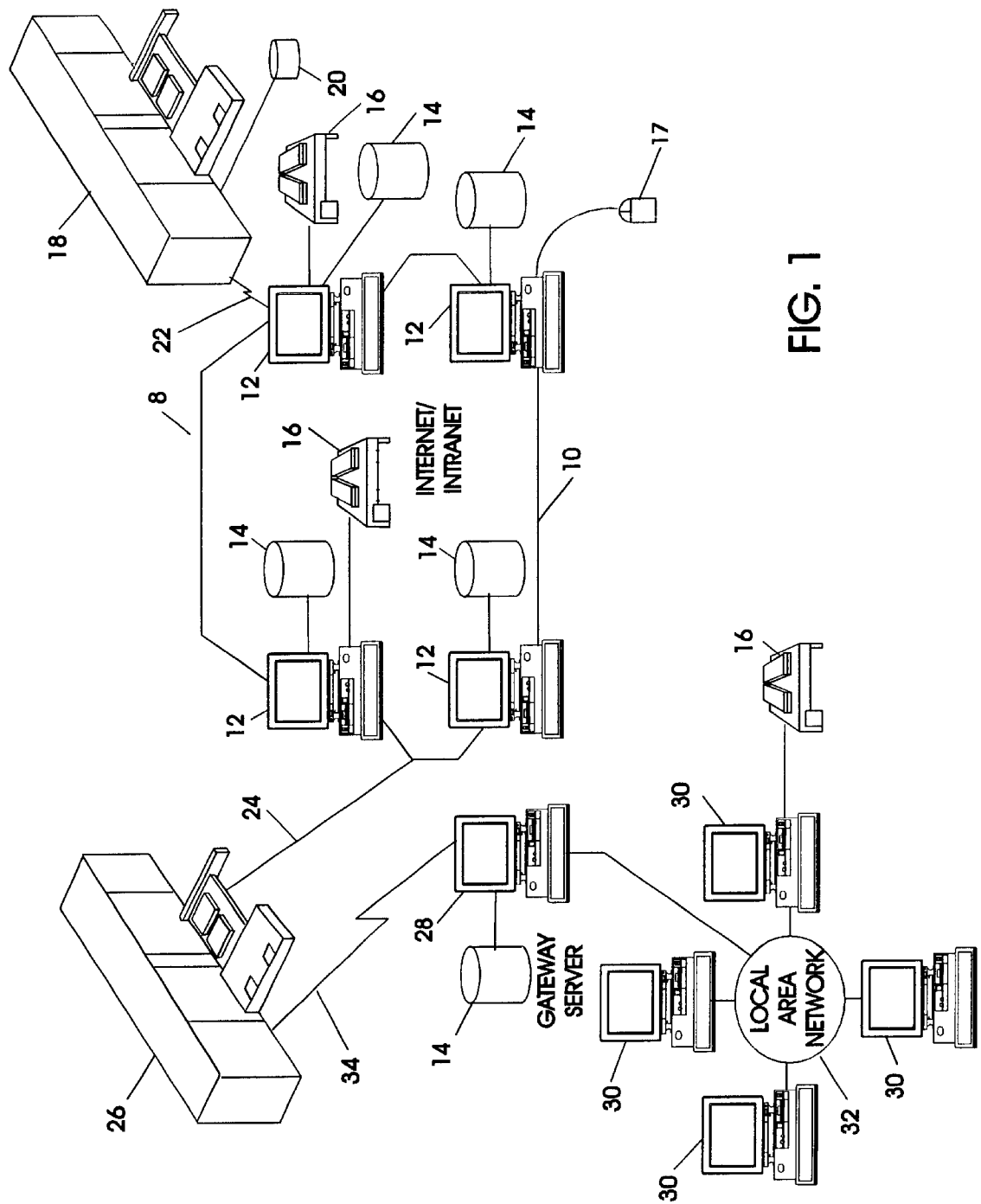
FIG. 1 is a pictorial representation of a data processing system which may be utilized to implement a method and system of the present invention.

Referring to FIG. 1, there is depicted a graphical representation of a data processing system 8, which may utilized to implement the present invention. As may be seen, data processing system 8 may include a plurality of networks, such as Internet/Intranet 10 and Local Area Network (LAN) 32, each of which preferably includes a plurality of individual computers 12 and 30, respectively. Of course, those skilled in the art will appreciate that a plurality of Intelligent Work Stations (IWS) coupled to a host processor may be utilized for each such network. As is common in such data processing systems, each individual computer may be coupled to a storage device 14 and/or a printer/output device 16 and may be provided with a pointing device such as a mouse 17.

The data processing system 8 may also include multiple mainframe computers, such as mainframe computer 18, which may be preferably coupled to Internet/Intranet 10 by means of communications link 22. The mainframe computer 18 may also be coupled to a storage device 20 which may serve as remote storage for Intranet/Internet 10. Similarly, Intranet/Internet 10 may be coupled via communications link 24 through a sub-system control unit/communications controller 26 and communications link 34 to a gateway server 28. The gateway server 28 is preferably an IWS which serves to link LAN 32 to Intranet/Internet 10.

With respect to LAN 32 and Intranet/Internet 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from Intranet/Internet 10 and similarly, Intranet/Internet 10 may be located a substantial distance from LAN 32. For example, LAN 32 may be located in California while Intranet/Internet 10 may be located within North Carolina and mainframe computer 18 may be located in New York.

Software program code which employs the present invention is typically stored in the memory of a storage device 14 of a stand alone workstation or Intranet/internet server from which a developer may access the code for distribution purposes, the software program code may be embodied on any of a variety of known media for use with a data processing system such as a diskette or CD-ROM or may be distributed to users from a memory of one computer system over a network of some type to other computer systems for use by users of such other systems. Such techniques and methods for embodying software code on media and/or distributing software code are well-known and will not be further discussed herein.

The present invention is described below in its preferred embodiment as part of a Java development environment. Object oriented language, such as Java, Smalltalk and C++ typically include class libraries for use by developers when programming (developing applications) in the language. Class libraries are reusable sets of classes which typically provide relatively high level functionality. A class is one of the basic building blocks of object oriented language, and comprises code which represents a combination of function and data. A developer creates an application by adding classes from a class library to the software application being created. A copy or instance of a class is included in the application being created.

A developer may manipulate classes in a predetermined number of ways, depending on the features of the individual language. For example, most object oriented classes have a number of basic characteristics, including encapsulation, polymorphism, and inheritance. Through polymorphism, a software component or class may make a request of another instance of the class without knowing exactly what that component or object is. The object or component which receives the request interprets the request and determines, in accordance with its internal data and functions, how to execute the request. The concept of inheritance permits easy modification of a class. A developer can write a subclass which inherits behavior from all of its parent classes.

All these properties of object oriented programming, as well as related object oriented programming techniques, are well known to those skilled in the art and will not be discussed in depth herein. While the present invention will be described in terms of converting a control into a Java class, the present invention may be utilized by a skilled programmer for converting controls into other programming languages. It is a purpose of the present invention to provide prepackaged self-testing controls to programmers for use thereby.

Figure 2:
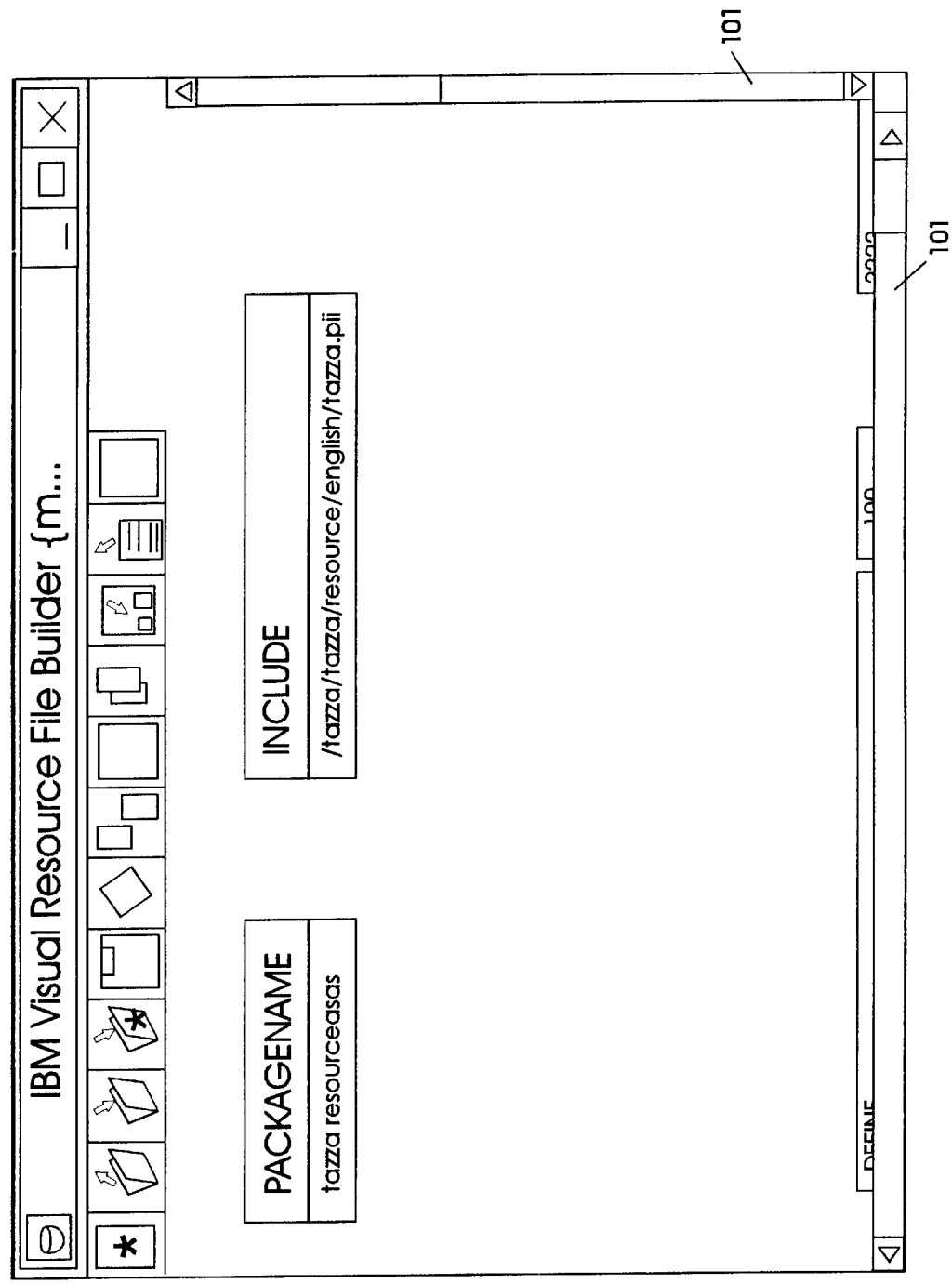
FIG. 2 is a graphical representation of an application window with a user interface control (scroll panel) provided in accordance with the prior art.

FIG. 2 illustrates a graphical user interface which uses a ScrollPanel control 101 as taught in the prior art. The programmer has constructed an application and used the ScrollPanel control 101 application programming interface (API). The compiled to machine code of the source code is delivered from the software manufacturer as a product to the programmer to be called for inclusion in a program.

The programmer cannot simply select, call or view the ScrollPanel control by itself. So, if the programmer is unfamiliar with the control and wants to check its function, it is necessary to write code that will implement the control therein. As shown in FIG. 2, the programmer has to write the code (not shown) necessary to produce panel 102. The programmer then writes the code (not shown) needed to call the ScrollPanel control 101 API. This allows the programmer to see the control 101 and test its function, but unnecessary steps are required to do so.

Figure 3:
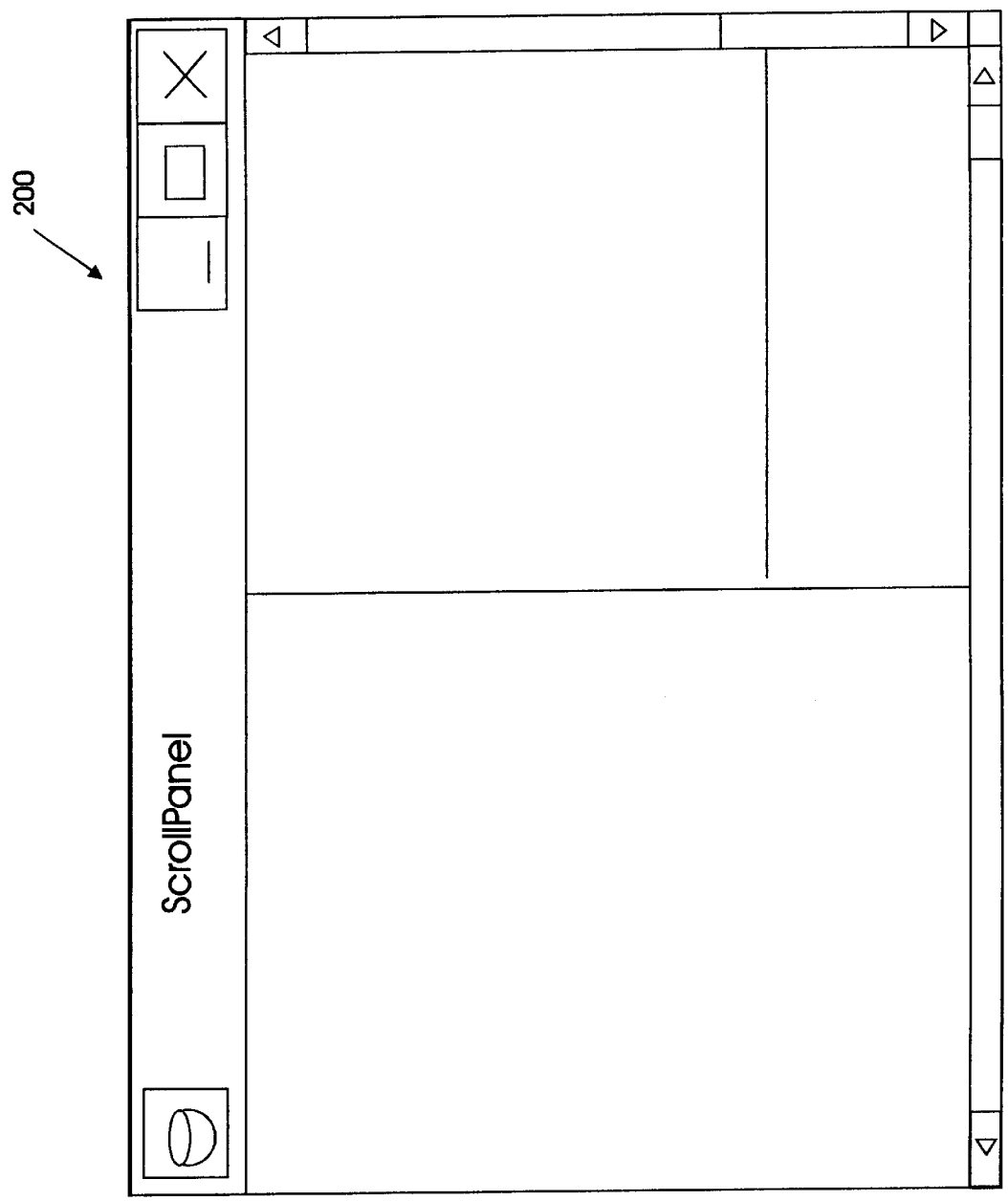
FIG. 3 is a graphical representation of a self-testing control in accordance with the present invention.

FIG. 3 illustrates a ScrollPanel control 200 that has implemented the packaging process of the present invention to enable self inspection thereof. The ScrollPanel control 200 has the full functionality of the control 101 (see FIG. 2), and allows the programmer the same testing capabilities. However, due to the present invention, the programmer can merely execute the control and have the control presented without the need to write application code.

Referring to FIG. 4, a greatly abbreviated example of Java source code used to generate the ScrollPanel of FIG. 2 prior to being compiled for delivery to an end use developer is shown. Obviously, the source code would not be delivered to the programmer for use. The code would be provided in machine readable form after the source code has been compiled. Therefore, the end user would be unable to access the source code by any method short of writing the code himself. Thus, an API must be called through an application to execute and graphically present the control.

FIG. 5 illustrates the method of the present invention. By adding an entry point 'main' (generally identified by the reference numeral 500) for the runtime system to call, self inspection of the control will be allowed without the programmer being required to write, compile, and execute source code to display the control. By providing this prewritten code; controls can be delivered as standalone objects which can be investigated without the need of a viewer. In addition, the unpredictable additions of new objects will not necessitate update of a viewer to handle them since the control itself will allow self inspection.

Figure 6:
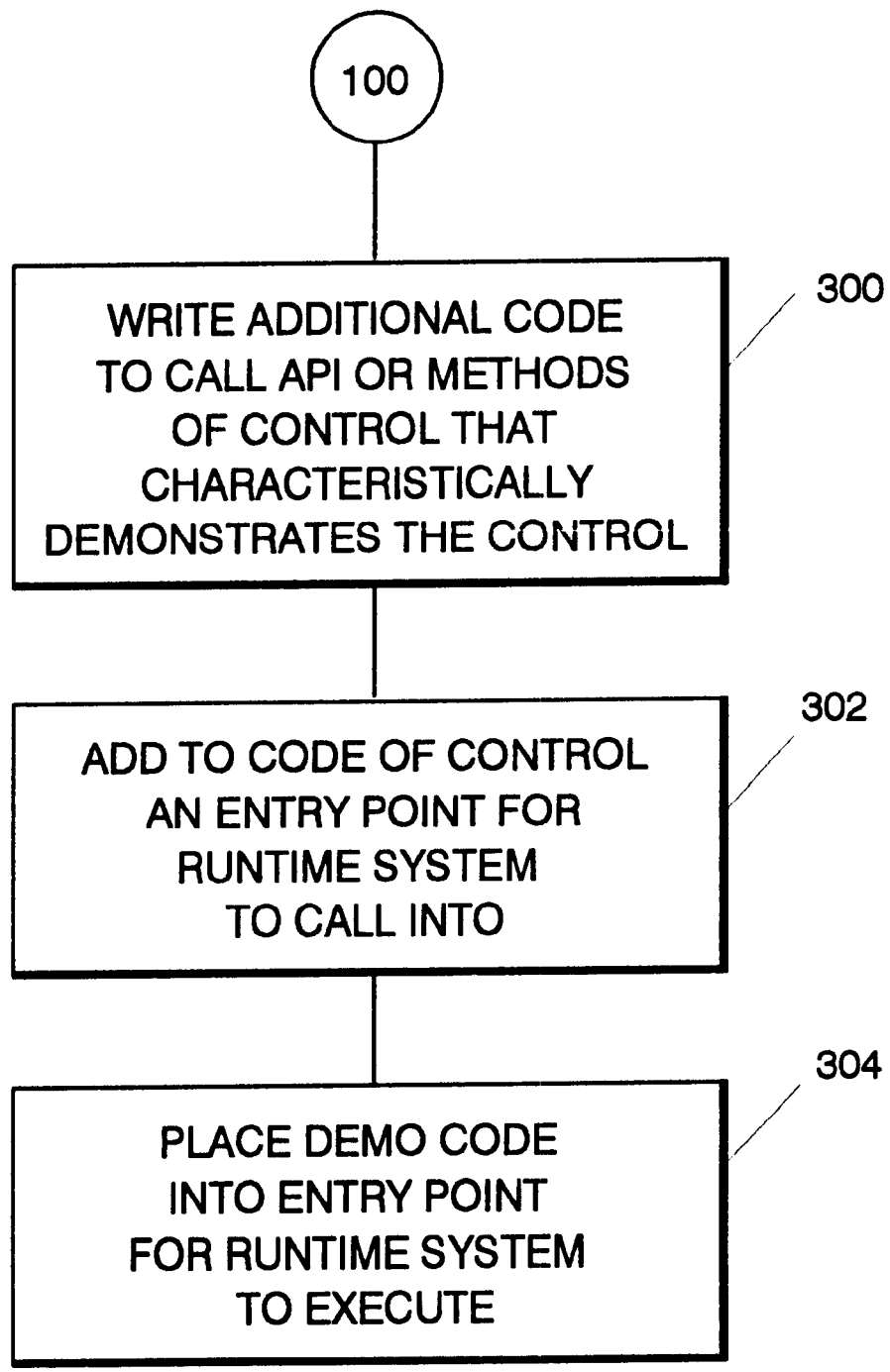
FIG. 6 is a high level flowchart illustrating implementation of the present invention.

FIG. 6 is a flowchart illustrating implementation of the present invention. After starting at 100, additional code is written at block 300 that will call the API or whatever method of control that characteristically demonstrates the control. At block 302, an entry point for the runtime system to call into is added to the source code of the control. At block 304, demonstration code is placed into the entry point for the runtime system to execute.

Although the present invention has been described with respect to a specific preferred embodiment thereof, various changes and modifications may be suggested to one skilled in the art and it is intended that the present invention encompass such changes and modifications as fall within the scope of the appended claims.

What is claimed is:

1. A method of providing a self-testing control for use with a data processor, comprising the steps of:

adding demonstration code to a user interface control to call an API of said control; and adding an entry point to said control for a runtime system to call said demonstration code in order to allow said runtime system to execute said control.

2. A system for providing a self-testing control for use with a data processor, comprising:

means for adding demonstration code to a user interface control to call an API of said control; and means for adding an entry point to said control for a runtime system to call said demonstration code in order to allow said runtime system to execute said control.

3. A computer program product recorded on computer readable medium for providing a self-testing control for use with a data processor, comprising:

computer readable means for adding demonstration code to a user interface control to call an API of said control; and computer readable means for adding an entry point to said control for a runtime system to call said demonstration code in order to allow said runtime system to execute said control.

* * * * *